US008701020B1

(12) United States Patent
Fulcher et al.

(10) Patent No.: US 8,701,020 B1
(45) Date of Patent: Apr. 15, 2014

(54) TEXT CHAT OVERLAY FOR VIDEO CHAT

(75) Inventors: Richard Fulcher, Sunnyvale, CA (US); Michael D. Dodd, Kirkland, WA (US); Evan Miller, Redmond, WA (US); Wei Huang, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,964

(22) Filed: Sep. 30, 2011

Related U.S. Application Data

(63) Continuation of application No. 13/019,203, filed on Feb. 1, 2011.

(51) Int. Cl.
*G06F 3/00* (2006.01)

(52) U.S. Cl.
USPC ............................. 715/756; 715/753; 715/758

(58) Field of Classification Search
USPC .......................................................... 715/756
See application file for complete search history.

(56) References Cited

U.S. PATENT DOCUMENTS

| 5,444,477 | A* | 8/1995 | Yamadera et al. ......... 348/14.07 |
| 5,610,653 | A* | 3/1997 | Abecassis ..................... 348/170 |
| 5,815,196 | A* | 9/1998 | Alshawi ..................... 348/14.12 |
| 6,731,323 | B2* | 5/2004 | Doss et al. .................. 348/14.01 |
| 7,565,680 | B1* | 7/2009 | Asmussen ..................... 725/135 |
| 8,582,474 | B2* | 11/2013 | Satterlee et al. ............. 370/260 |
| 2002/0093531 | A1* | 7/2002 | Barile .......................... 345/753 |
| 2003/0074451 | A1 | 4/2003 | Parker et al. |
| 2004/0145652 | A1 | 7/2004 | Yamauchi et al. |
| 2004/0155902 | A1* | 8/2004 | Dempski et al. ............. 345/757 |
| 2006/0053466 | A1* | 3/2006 | Ikeda ........................... 725/133 |
| 2006/0148512 | A1* | 7/2006 | Ekholm et al. ............. 455/550.1 |
| 2008/0059580 | A1 | 3/2008 | Kalinowski et al. |
| 2008/0059581 | A1 | 3/2008 | Pepperell |
| 2008/0134057 | A1* | 6/2008 | Yun .............................. 715/758 |
| 2008/0201438 | A1* | 8/2008 | Mandre ....................... 709/206 |
| 2008/0231545 | A1* | 9/2008 | Gong ........................... 345/1.1 |
| 2008/0273077 | A1 | 11/2008 | Cowherd |
| 2009/0119725 | A1* | 5/2009 | Park et al. ................... 725/106 |
| 2009/0199078 | A1* | 8/2009 | Caspi et al. .................. 715/202 |
| 2010/0037151 | A1 | 2/2010 | Ackerman et al. |
| 2010/0246571 | A1 | 9/2010 | Geppert et al. |
| 2011/0107220 | A1* | 5/2011 | Perlman ...................... 715/720 |

OTHER PUBLICATIONS

Pogue, David, iPhone: The Missing Manual, Fourth Edition, O'Reilly Media, Inc., (published Dec. 1997).*
Cline, Jason, Connect to the Mobile Web with SMS, SitePen, available at http://www.sitepen.com/blog/2008/06/30/connect-to-the-mobile-web-with-sms/ (Jun. 30, 2008).*

(Continued)

*Primary Examiner* — Linh K Pham
*Assistant Examiner* — Conrad Pack
(74) *Attorney, Agent, or Firm* — Shumaker & Sieffert, P.A.

(57) ABSTRACT

In general, this disclosure describes techniques for overlaying information related to a text message onto a video. In one example, a method includes receiving communication data at a first computing device that is sent from a second computing device while the first and second computing devices are engaged in a real-time video communication, wherein the communication data comprises video data. The method also includes displaying the video data on a display of the first computing device and receiving a text-based message at the first computing device that is sent from the second computing device during the real-time video communication. The method further includes overlaying information related to the text-based message onto the video data displayed on the display of the first computing device.

15 Claims, 4 Drawing Sheets

(56) References Cited

OTHER PUBLICATIONS

YourUpdate, Bringing the Face Time to Online Communication, YouTube, tokbox.com, available at http://www.youtube.com/watch?v=fvBEsfh7vS0 (uploaded May 19, 2009).*

Mobile Mouse Pro, Mobile Mouse for the iPhone, iPod & iPad, MobileMouse.com, available at http://mobilemouse.com/overviewClipboard.html, YouTube video also available at http://www.youtube.com/watch?v=NCqwKgIZoo8 (posted Dec. 20, 2010).*

Skype, Introducing the new Skype for Mac, YouTube, available at http://www.youtube.com/watch?v=atvAdN9bENc (posted Jan. 26, 2011).*

York, Dan, Skype 5.0 Beta for Mac OS X: A First Look with Screenshots, Disruptive Telephony, available at http://www.disruptivetelephony.com/2010/11/skype-50-beta-for-mac-os-x-a-first-look-with-screenshots.html (Nov. 4, 2010).*

"CU-SeeMe" Wikipedia, the free encyclopedia [online]. Wikimedia Foundation, Inc. Last modified on Feb. 15, 2011. Retrieved from the Internet: <URL: http://en.wikipedia.org/wiki/CU-SeeMe> (3 pgs.)

"Open Communications," Google Talk for Developers (Labs), Google code labs [online]. Google Inc. 2011. Retrieved from the Internet on Jan. 25, 2011: <http://code.google.com/apis/talk/open_communications.html> (3 pgs.).

Slack, S.E., "Use instant messaging and video chat to stay in touch," Instant video messaging—free webcam chat via Windows Live Messenger calls [online]. Microsoft, 2011. Retrieved from the Internet on Jan. 24, 2011: <URL: http://www.microsoft.com/athome/photos/imvideo.aspx> (4 pgs.).

U.S. Appl. No. 13/019,203, by Richard Fulcher, filed Feb. 1, 2011.

Office Action from U.S. Appl. No. 13/019,203, dated Nov. 25, 2011, 24 pp.

Response to Office Action dated Nov. 25, 2011, from U.S. Appl. No. 13/019,203, filed Feb. 27, 2012, 22 pp.

Office Action from U.S. Appl. No. 13/019,203, dated May 22, 2012, 14 pp.

"Mobile Mouse Pro, Mobile Mouse for the iPhone, iPod & iPad", MobileMouse.com. Retrieved from the Internet: <http://mobilemouse.com/overviewClipboard.html> YouTube video also available at: <http://www.youtube.com/watch?v=NCqwKgIZoo8> Posted Dec. 20, 2010, 8 pgs.

* cited by examiner

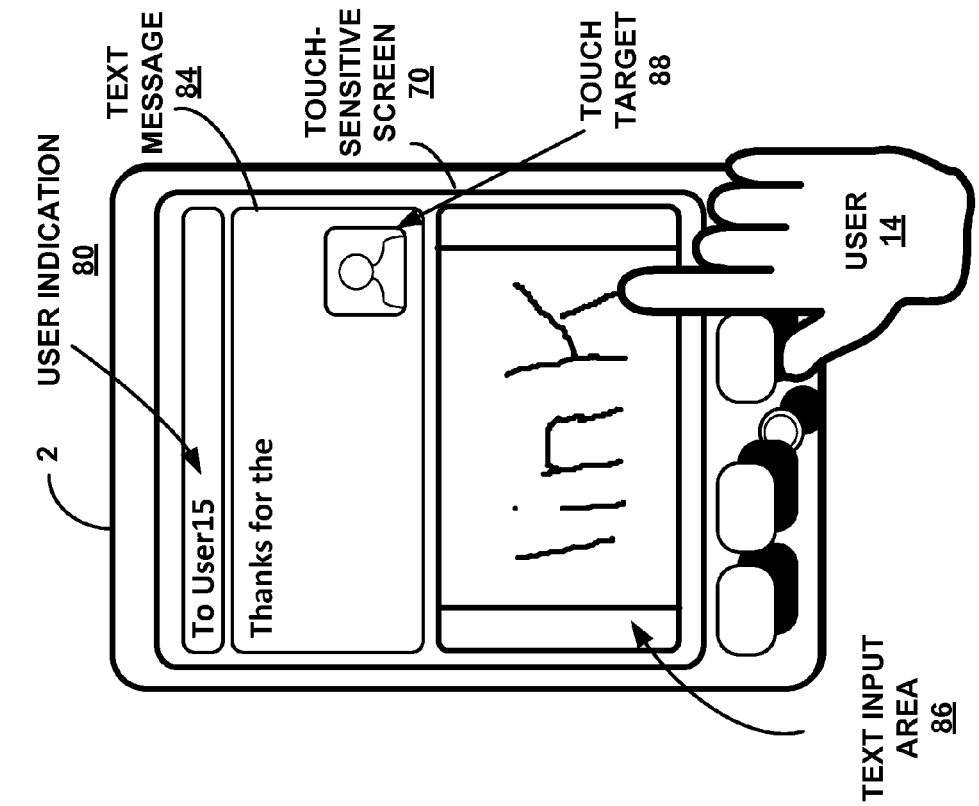
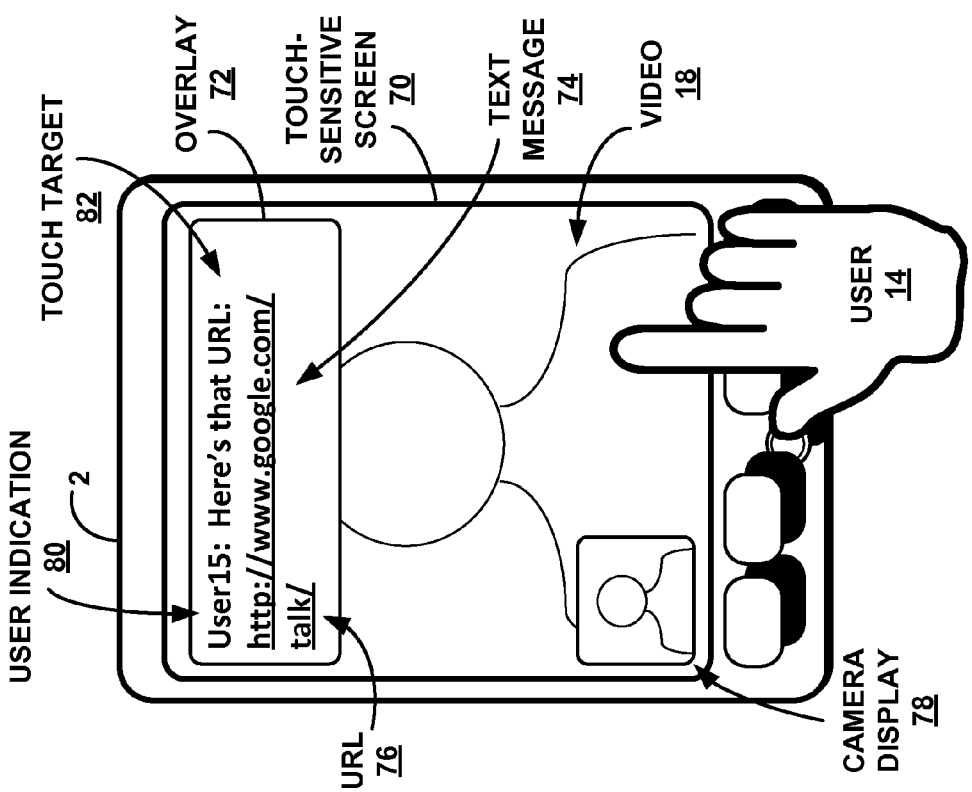

TEXT CHAT OVERLAY FOR VIDEO CHAT

This application is a continuation of U.S. application Ser. No. 13/019,203, filed Feb. 1, 2011, which is assigned to the assignee hereof and is hereby expressly incorporated by reference herein.

TECHNICAL FIELD

The disclosure relates to instant messaging and video chat communications between computing devices.

BACKGROUND

Two or more users of computing devices may often engage in real-time video communications, such as video conferencing, where the users exchange live video and audio transmissions (referred to herein as "video chat"). Sometimes, a first user may wish to send a text-based message (referred to herein as "text chat") to a second user during the video chat. When the second user is using a computing device with a relatively small screen (such as a mobile phone, PDA, tablet computer, or other mobile device), there is little available room to display the text chat, such that the second user may be unable to receive the text-based message during the video chat.

SUMMARY

In one example, a method includes, receiving communication data at a first computing device that is sent from a second computing device while the first and second computing devices are engaged in a real-time video communication, wherein the communication data comprises video data; displaying the video data on a display of the first computing device; receiving a text-based message at the first computing device that is sent from the second computing device during the real-time video communication; and overlaying information related to the text-based message onto the video data displayed on the display of the first computing device.

In another example, a non-transitory computer-readable medium is encoded with instructions for causing a programmable processor to perform operations including: receiving communication data at a first computing device that is sent from a second computing device while the first and second computing devices are engaged in a real-time video communication, wherein the communication data comprises video data; displaying the video data on a display of the first computing device; receiving a text-based message at the first computing device during the real-time video communication; and overlaying information related to the text-based message onto the video data displayed on the display of the first computing device.

In one example, a computing device includes one or more processors. The computing device further includes a network interface to receive communication data from a second computing device while the first and second computing devices are engaged in a real-time video communication, wherein the communication data comprises audio data and video data, and an output device that displays the video data. The computing device further includes means for overlaying, onto the displayed video data, a text-based message received from the second computing device by the computing device during the real-time video communication.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a block diagram illustrating one example of a computing device operating in a video mode displaying a text-based message in an overlay box, in accordance with one or more aspects of the present disclosure.

FIG. 4B is a block diagram illustrating one example of computing device operating in a text mode during a real-time video communication, in accordance with one or more aspects of the present disclosure.

In accordance with common practice, the various described features are not drawn to scale and are drawn to emphasize features relevant to the present invention. Like reference characters denote like elements throughout the figures and text.

DETAILED DESCRIPTION

Techniques of the present disclosure allow a computing device to display at least a portion of a text message while simultaneously displaying a video chat, without interrupting the video chat. A first user of a first computing device, for example, a mobile device, may correspond with a second user of a second computing device over a real-time video communication. The first computing device may include a touch-sensitive display in which a video stream from the second user is displayed. The second user, or another user not participating in the video chat, may compose and send a text message to the first user during the real-time video communication. The content of the text message may be displayed as an overlay on the video without interrupting the video. In some examples, the text message is displayed in an interactive overlay box. The first user may interact with the overlay box to switch the computing device between different operating modes or to perform an action related to the text message.

Figure 1:
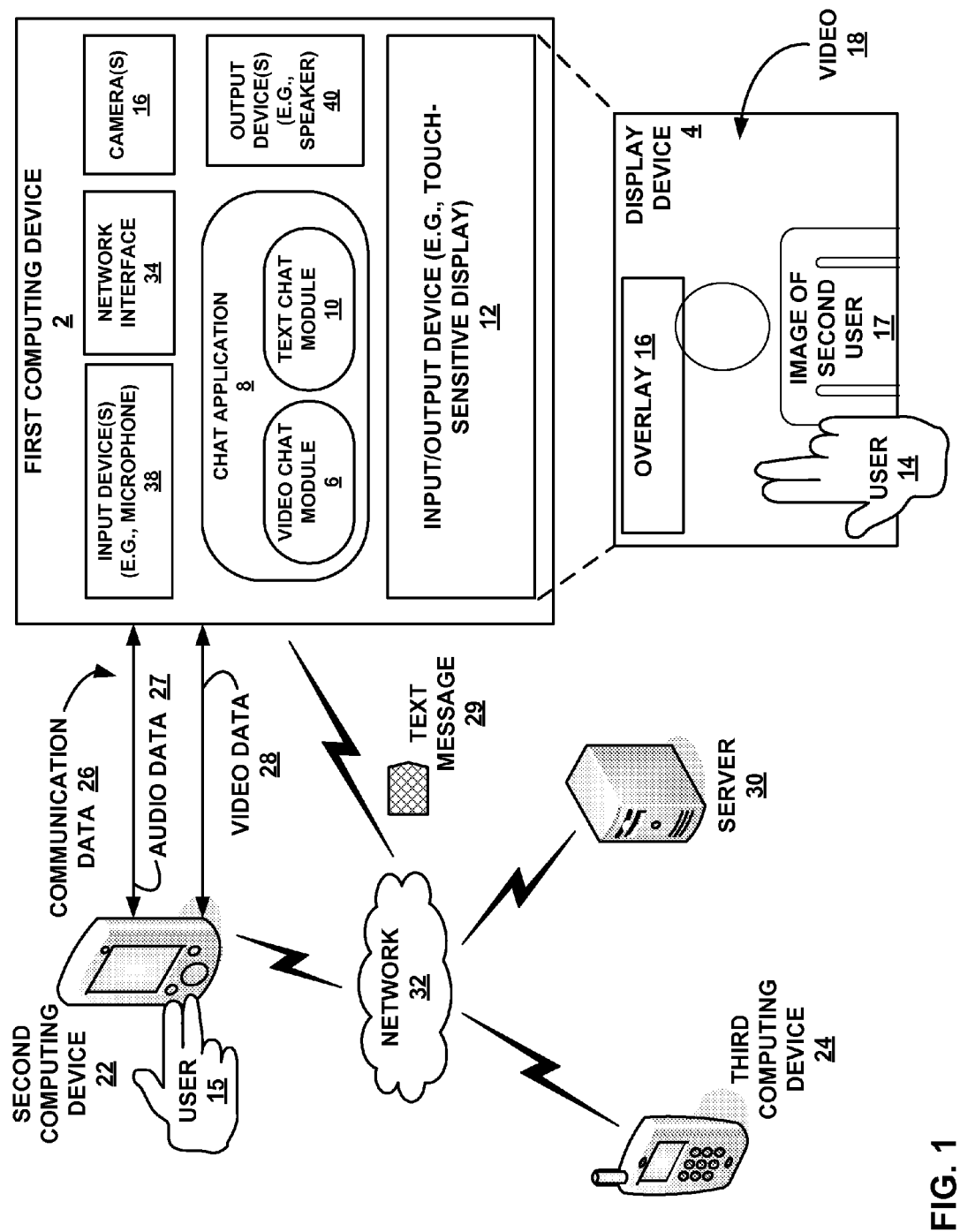
FIG. 1 is a block diagram illustrating an example of a computing device that may execute one or more applications and receive a text message during a video chat, in accordance with one or more aspects of the present disclosure.

FIG. 1 is a block diagram illustrating an example of a computing device 2 that may execute one or more applications (e.g., chat application 8) and receive a text message 29 during a video chat, in accordance with one or more aspects of the present disclosure. Computing device 2 may, in some examples, include or be part of a portable computing device (e.g., a mobile phone, netbook, laptop, personal data assistant (PDA), tablet device, portable gaming device, portable media player, e-book reader, or a watch) as well as non-portable devices (e.g., a desktop computer). For purposes of illustration only, in this disclosure, computing device 2 is described as a portable or mobile device that a user 14 can carry, such as a laptop, or a desktop computer, but aspects of this disclosure should not be considered limited to such devices.

Computing device 2 may include a display device 12 (e.g., a touch-sensitive device), one or more input devices 38 (e.g., a microphone), a camera 16, and one or more output devices 40 (e.g., a speaker). In some examples, display device 12 may comprise a touch-sensitive display 4. In some examples, touch-sensitive display 4 may be capable of receiving touch input from a user 14 (e.g., touch screen, track pad, track point, or the like). User 14 may interact with display device 12, for example, by performing touch input on touch-sensitive display 4. One example of computing device 2 is more fully described in FIG. 2, discussed below.

Computing device 2 may connect to a network 32, including a wired or wireless network, as well as to a server 30, via a network interface 34. Computing device 2 may connect to a second computing device 22 and a third computing device 24, or any other number of computing devices. Server 30 and computing devices 22 and 24 may be connected to network 32 via wired and/or wireless links. Computing devices 2, 22, and 24 may send data to or receive data from server 30 via network 32. Network 32 may include a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet). Server 30 may be any of several different types of network devices. For instance, server 30 may be a conventional web server, specialized media server, personal computer operating in a peer-to-peer fashion, or other types of network devices.

Computing device 2 may be connected to second computing device 22 in a peer-to-peer fashion, either directly or through network 32. A peer-to-peer connection may be a network connection that partitions tasks or workloads between peers (e.g., first and second computing devices 2 and 22, respectively) without centralized coordination by a server (e.g., server 30). In the example shown in FIG. 1, first computing device 2 and second computing device 22 exchange communication data 26 via a peer-to-peer connection. In other examples, server 30 may provide conference calling capabilities in accordance with one aspect of this disclosure. For example, server 30 may manage a three-way video conference call with instant messaging capabilities between computing devices 2, 22, and 24.

Although the systems and techniques described herein support conferencing capabilities, for illustrative purposes only, FIG. 1 will be described in terms of a real-time video communication between first computing device 2 and second computing device 22. However, it is to be understood that the techniques and examples described in accordance with this disclosure apply to communications having more than two participants.

In FIG. 1, first computing device 2 and second computing device 22 have established a real-time video communication. User 14 operates first computing device 2 and a second user 15 operates the second computing device 22. As shown in FIG. 1, an image of second user 17 is displayed on touch-sensitive display 4 of first computing device 2. User 14 and second user 15 may be engaged in a video chat.

In one example, first computing device 2 and second computing device 22 exchange communication data 26, which may be streamed real-time. In some examples, communication data 26 may include video data 28 (e.g., from camera 16) and audio data 27 (e.g., from microphone 38). In some examples, video data 28 and audio data 27 may be transferred between first computing device 2 and second computing device 22 over different channels. In other examples, video data 28 and audio data 27 may be transferred over a single channel. In one example, communication data 26 may be transferred using an Real-time Transport Protocol ("RTP") standard developed by the Internet Engineering Task Force ("IETF"). In examples using RTP, video data 28 may have a format such as H.263 or H.264. In other examples, other protocols or formats are used. In other examples, some or all of communication data 26 or text message 29 may be transferred encrypted, such as, for example, using Secure Real-time Transport Protocol (SRTP), or any other encrypted transfer protocol.

In one example, video data 28 and audio data 27 may be associated with each other (e.g., audio data 27 is diegetic to video data 28). In other examples, video data 28 and audio data 27 may not be associated with each other (e.g., audio data 27 is non-diegetic with video data 28, for example, a sound track is played along with video data 28). In some examples, communication data 26 may include both audio data 27 and video data 28; however, in other examples, communication data 26 may include only one of either audio data 27 or video data 28. Further, at any given moment during the real-time video communication, either of computing devices 2 and 22 may be sending only audio data 27, only video data 28, or both.

First computing device 2 includes a chat application 8 that, when executed, provides functionality to first computing device 2 to establish and maintain communications between one or more computing devices (e.g., second computing device 22). Chat application 8 may also provide signals to display device 12 to display information related to the communications and to enable user 14 to interact with chat application 8.

Chat application 8 may include a video chat module 6 and a text chat module 10. Video chat module 6, in various instances, provides first computing device 2 with capabilities to participate in a video conference between first computing device 2 and one or more computing devices. Text chat module 10, in various instances, provides first computing device 2 with capabilities to participate in a text-based conference between first computing device 2 and one or more computing devices. For example, text chat module 10 provides instant messaging capabilities between first computing device 2 and second computing device 22. In other examples, chat application 8 contains further communication modules having additional capabilities.

Chat application 8 may allow first computing device 2 to operate in a plurality of different modes. For example, video chat module 6 may correspond to a video mode, where received video data 28 may be displayed on computing device 2. In video mode, one or more cameras 16 and one or more other input devices 38 of first computing device 2 may be activated. For example, user 14 may point camera 16 at her or his face or another object of interest during video mode in order to transmit a video. Input device 38, such as a microphone, may record any sound incident to the microphone, such as user 14's voice. First computing device 2 may, in real-time, send this first video data from camera 16 and first audio data from input device 38 to second computing device 22.

Likewise, second computing device 22 sends second video data and second audio data from similar input devices to first computing device 2. During video mode, first computing device 2 may output some or all of this communication data 26, for example, with output devices 40 (e.g., a speaker) and display device 12. In some examples, first computing device 2 may switch between different cameras 16, such as a front-facing camera and a rear-facing camera. In further examples, audio data may not be streamed during video mode. In another example, multiple audio data may be streamed by first computing device 2. In other examples, video data may be sourced from a variety of inputs besides camera 16, such as, for example, a slideshow of pictures, a pre-recorded video feed, a screencast showing a window, or the like. Similarly, audio data may be sourced from any audio source, for example, a sound file stored on one of computing devices 2 or 22.

Text chat module 10 may correspond to a text mode, enabling user 14 to compose or send a text message, or to respond to text message 29 received by first computing device 2. That is, in one example, first computing device 2 may communicate with computing devices 22 and 24 via instant messaging or text chat. For example, while engaged in a real-time video communication with user 14, second user 15 desires to send an instant message to user 14. In one example, second user 15 types out, or otherwise inputs, a text-based message to user 14. This text-based message may then be sent to first computing device 2 as text message 29. Text message 29 may be any message that at least partially contains text-based information.

In some examples, a text chat may be established between first computing device 2 and second computing device 22 when one of the computing devices 2 or 22 initiates text mode or sends text-based message 29. In other examples, a text chat may be established between first computing device 2 and second computing device 22 when the real-time video communication is established between computing devices 2 and 22. In other examples, user 14 may toggle between video mode and text mode to initiate either mode.

In some examples, server 30 may facilitate instant messaging between the computing devices 2, 22, and 24. For example, server 30 may route text message 29 sent from second computing device 22 to first computing device 2 during a real-time video conference between the computing devices 2 and 22. Any protocol or format compatible with text-based messages may be used for transferring text message 29, such as, but not limited to Extensible Messaging and Presence Protocol ("XMPP"). Routing text message 29 through server 30 may enable a searchable text chat history to be stored. In one example, server 30 stores at least a part of the text chat history between first computing device 2 and second computing device 22. In further examples, server 30 may route communication data 26 between computing devices 2 and 22 in addition to text message 29.

Display device 12 of first computing device 2 may display video data 28. In one example, display device 12 includes a touch-sensitive display 4 that may display video 18 when first computing device 2 is operating in video mode. As shown in FIG. 1, video 18 may display an image of second user 15 from the video data 28. In conference call examples, touch-sensitive display 4 may display a video corresponding to whichever user (e.g., second user 15) is currently speaking.

In addition to displaying video 18 during video mode, touch-sensitive display 4 may further display an overlay 16. Overlay 16 may be an image having any shape, size, coloration, or style that is overlaid on top of video 18. In one example, overlay 16 displays information related to text message 29. For example, overlay 16 may display the textual content of the text message 29. For example, if the text message 29 included the sentence "Hi, how are you?", overlay 16 may display "Hi, how are you?" over the video 18. In other examples, overlay 16 displays other information related to text message 29, such as but not limited to, for example, a Uniform Resource Identifier (URI), a Uniform Resource Locator (URL), an image that was included with text message 29, a link or option to download a file, or a request to upload a file.

In yet another example, audio data 27 may further include speech (for example, user 15 is speaking) Computing device 2 may convert at least a portion of the speech into text. If the speech is in a language other than a selected language (e.g., user 14's native language, or the language computing device 2 may be set to), computing device 2 may translate the text into the selected language. Computing device 2 may overlay at least a portion of the text or, if applicable, the translated text, onto the video data displayed on the display device 4. In one example, computing device 2 may display the text or translated text onto display device 4 as video data 28 is streaming.

Figure 2:
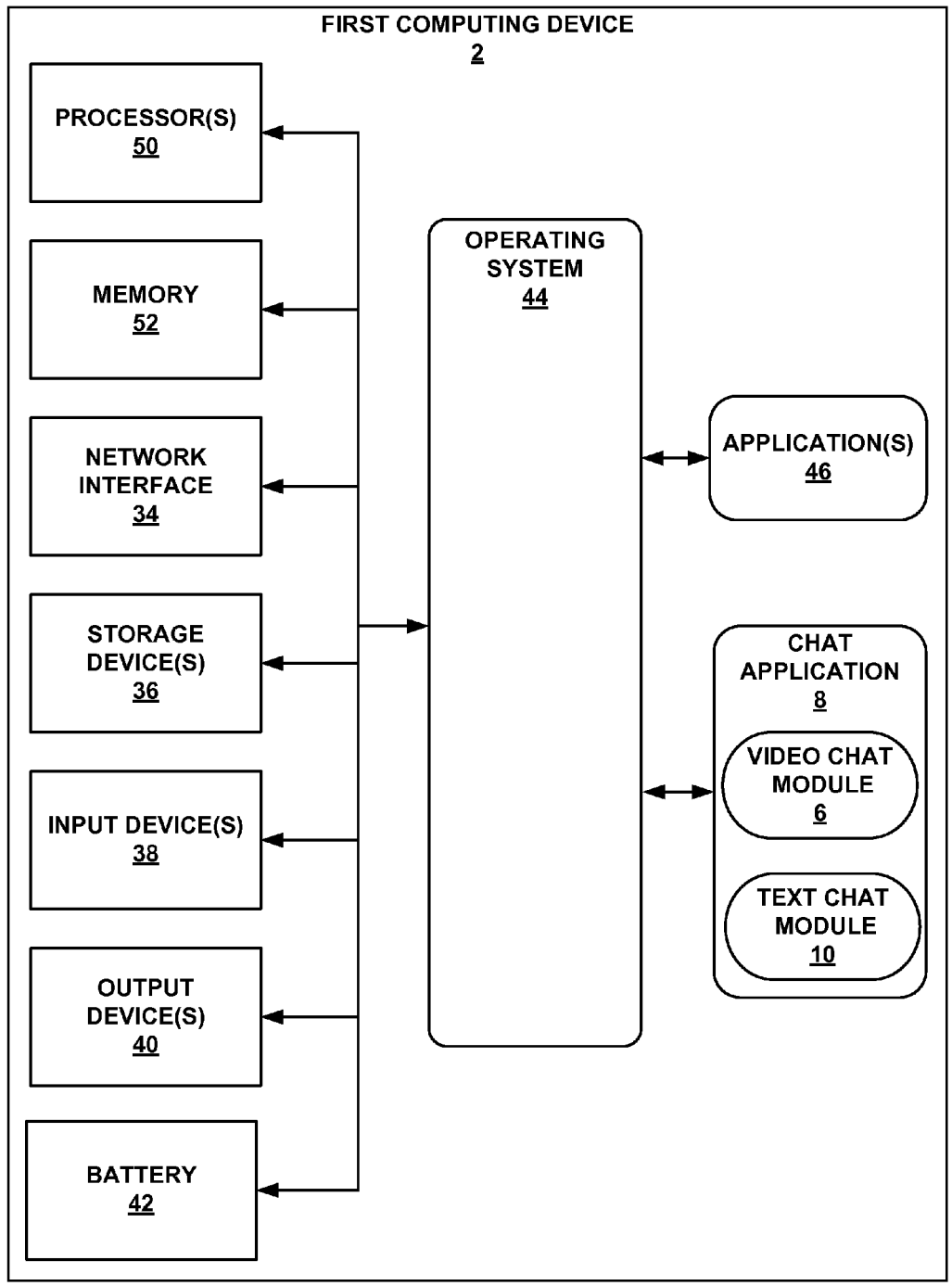
FIG. 2 is a block diagram illustrating further details of one example of the computing device shown in FIG. 1, in accordance with one or more aspects of the present disclosure.

FIG. 2 is a block diagram illustrating further details of one example of computing device 2 shown in FIG. 1. FIG. 2 illustrates only one particular example of computing device 2, and many other example embodiments of computing device 2 may be used in other instances.

As shown in the specific example of FIG. 2, computing device 2 includes one or more processors 50, memory 52, a network interface 34, one or more storage devices 36, one or more input devices 38, one or more output devices 40, and battery 42. Computing device 2 also includes an operating system 44, which may include chat application 8 executable by computing device 2. Computing device 2 may include one or more applications 46 and chat application 8. Chat application 8 may include video chat module 6 and text chat module 10 executable by computing device 2. Operating system 44, applications 46 and chat application 8 are also executable by computing device 2. Each of components 50, 52, 34, 36, 38, 40, 42, 44, 46, 6, 8, and 10 may be interconnected (physically, communicatively, and/or operatively) for inter-component communications.

Processors 50 may be configured to implement functionality and/or process instructions for execution in computing device 2. Processors 50 may be capable of processing instructions stored in memory 52 or instructions stored on storage devices 36.

Memory 52 may be configured to store information within computing device 2 during operation. Memory 52 may, in some examples, be described as a non-transitory computer-readable storage medium. In some examples, memory 52 is a temporary memory, meaning that a primary purpose of memory 52 is not long-term storage. Memory 52 may also, in some examples, be described as a volatile memory, meaning that memory 52 does not maintain stored contents when the computer is turned off. Examples of volatile memories include random access memories (RAM), dynamic random access memories (DRAM), static random access memories (SRAM), and other forms of volatile memories known in the art. In some examples, memory 52 may be used to store program instructions for execution by processors 50. Memory 52 may be used by software or applications running on computing device 2 (e.g., one or more of applications 46) to temporarily store information during program execution.

Storage devices 36 may also include one or more computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes a network interface 34. Computing device 2 may utilize network interface 34 to communicate with external devices via one or more networks, such as network 32. In one example, network interface 34 may correspond to an interface for receiving data from computing devices (e.g., computing devices 22 and 24 of FIG. 1). In some examples, input and output network interfaces 34 may be functionally integrated, while in other examples, input and output interfaces may be separate interfaces of network interface 34. Network interface 34 may be a network interface card, such as an Ethernet card, configured to communication over, for example, Ethernet, transmission control protocol (TCP), Internet protocol (IP), asynchronous transfer mode (ATM), or other network communication protocols. In other examples, network interface 34 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 2 may utilize network interface 34 to wirelessly communicate with an external device, such as server 30, a mobile phone, or other networked computing device. In some examples, computing device 2 may include a plurality of either or both input and output interfaces.

Computing device 2 may also include one or more input devices 38. Input device 38 may be configured to receive input from user 14 through tactile, audio, or video feedback. Examples of input device 38 may include a touch-sensitive display, mouse, a keyboard, a voice responsive system, a microphone, video camera 16, or any other type of device for detecting a command from user 14.

One or more output devices 40 may also be included in computing device 2, e.g., display device 12. Output device 40 may be configured to provide output to a user using tactile, audio, or video stimuli. Output device 40 may include a touch-sensitive display, a sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can provide output to user 14.

Computing device 2 may include one or more batteries 42, which may be rechargeable and provide power to computing device 2. Battery 42 may be made from nickel-cadmium, lithium-ion, or any other suitable material.

Computing device 2 may include operating system 44. Operating system 44 may control the operation of components of computing device 2. For example, operating system 44 may facilitate the interaction of application 46 or chat application 8 with processors 50, memory 52, network interface 34, storage device 36, input device 38, output device 40, and battery 42. Examples of operating system 44 may include Android®, Apple iOS®, Blackberry® OS, Symbian OS®, Linux®, Microsoft Windows Phone 7®, or the like.

Chat application 8 may additionally include video chat module 6 and text chat module 10, which may be executed as part of operating system 44. In other cases, video chat module 6 and text chat module 10 may be implemented or executed by computing device 2. Video chat module 6 may process video data, e.g., video data 28 received from second computing device 22, and may operate first computing device 2 in video mode. Similarly, text chat module 10 may process text data, e.g., text message 29 received from second computing device 22, and may operate first computing device 2 in text mode. Additionally, video chat module 6 and text chat module 10 may receive input from a component such as processors 50, memory 52, network interface 34, storage devices 36, one or more output devices 40, battery 42, or operating system 44. In some cases, video chat module 6 and text chat module 10 may perform additional processing on communication data 26. In other cases, video chat module 6 or text chat module 10 may transmit input to an application, e.g. application 46, or other component in computing device 2.

Any applications, e.g. application 46 or chat application 8, implemented within or executed by computing device 2 may be implemented or contained within, operable by, executed by, and/or be operatively/communicatively coupled to components of computing device 2, e.g., processors 50, memory 52, network interface 34, and/or storage devices 36.

Figure 3:
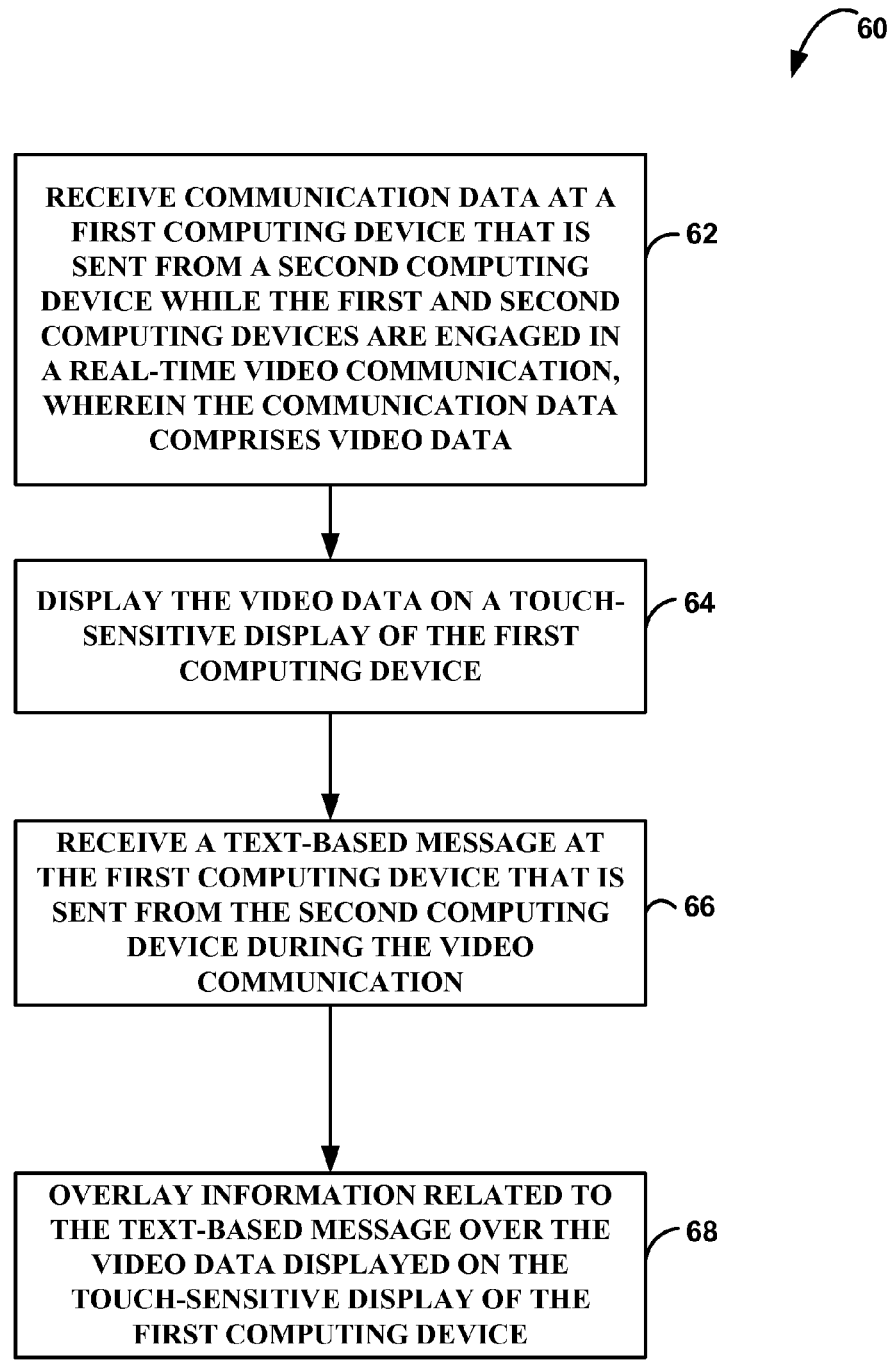
FIG. 3 is a flow chart illustrating an exemplary method that may be performed by a computing device to overlay at least a portion of a text message onto a video chat, in accordance with one or more aspects of the present disclosure.

FIG. 3 is a flow chart illustrating an exemplary method that may be performed by a computing device to overlay at least a portion of a text message onto a video chat, in accordance with one or more aspects of the present disclosure. For example, method 60 may be performed by computing devices 2, 22, or 24 shown in FIG. 1 or 2. In one example, method 60 may display at least a portion of the text message without interrupting the video chat.

Method 60 includes receiving communication data at a first computing device that is sent from a second computing device while the first and second computing devices are engaged in a real-time video communication, wherein the communication data comprises video data (62). For example, first computing device 2 and second computing device 22 may be engaged in a real-time video communication and may be exchanging video data 28. Method 60 further includes displaying the video data on a screen of the first computing device (64). For example, first computing device 2 displays video 18 of second user 15 on touch-sensitive display 4.

In this example, method 60 further includes receiving a text-based message at the first computing device that is sent from the second computing device during the video communication (66). For example, second computing device 22 sends text message 29 to first computing device 2. Method 60 may also include overlaying information related to the text-based message over the video data displayed on the screen of the first computing device (68). For example, first computing device 2 may display overlay 16 containing at least a portion of text message 29 over video 18. In another example, another computing device not engaged in the real-time video communication sends the first computing device a text message. In that example, at least a portion of the text message is overlaid on the video data from the second computing device.

In another example, the information related to the text-based message may be at least one of a textual content of the text-based message, a Uniform Resource Identifier (URI), an image, a link to a file, and combinations thereof. In one example, overlaying the information related to the text-based message over the video data may further include displaying an overlay over the video data that contains text from the text-based message, wherein at least a portion of the overlay corresponds to a touch-target. In another example, the overlay may further provides a graphical user indication identifying that the text-based message is sent from the second computing device.

In another example, method 60 further includes providing a touch-target on the display that, when activated by a user, toggles the first computing device between operating in an video mode and a text mode, wherein the display comprises a touch-sensitive display. In one example, the touch-target, when activated, further performs an action related to the text-based message. In yet another example, the information related to the text-based message may be a Uniform Resource Locator (URL) link, and the action related to the text-based message may link the user to a webpage corresponding to the URL link. In a further example, the touch-target, when activated by the user while the first computing device is in the video mode, may bypass the text mode to perform the action related to the text-based message.

In another example, method 60 further includes switching the first computing device into text mode when the touch-target is activated. In yet another example, method 60 includes providing an operation indication to the second computing device that the first computing device is operating in text mode when the first computing device switches to text mode. In one example, method 60 further includes disabling a camera of the first computing device when the first computing device switches to text mode. In a further example, method 60 may include displaying a smaller view of the video data when the first computing device is operating in text mode. In another example, method 60 may also include outputting first audio data at the first computing device, wherein the communication data comprises the first audio data and sending second audio data from the first computing device to the second computing device during the real-time video communication while the first computing device is operating in text mode. In a further example, method 60 may include buffering, by the first computing device, the video data while the first computing device is operating in text mode.

In another example, at least a third computing device may be participating in the real-time video communication between the first computing device and the second computing device. In such an example, method 60 may further include receiving a second text-based message at the first computing device that is sent from the third computing device during the real-time video communication. Method 60 may further include overlaying information related to the second text-based message onto the video data displayed on the display of the first computing device. Method 60 may additionally include graphically indicating that the information related to the first text-based message is sent from the second computing device and graphically indicating that the information related to the second text-based message is sent from the third computing device.

In yet another example, method 60 may include removing the information related to the text-based message from the display after a selected timeout period. In a further example, receiving the communication data may further include receiving the communication data over a peer-to-peer connection between the first computing device and the second computing device. In another example, receiving the text-based message may further include receiving the text-based message from a server communicatively coupled to the first computing device and to the second computing device. In yet another example, receiving communication data may further include receiving the communication data from the server.

In yet another example, the communication data may further include audio data that has speech. In one example, method 60 further includes converting at least a portion of the speech into text. When the speech is in a language other than a selected language (e.g., user 14's native language), method 60 further includes translating the text into the selected language. In another example, method 60 further includes overlaying at least a portion of the text onto the video data displayed on the display of the first computing device.

FIG. 4A is a block diagram illustrating one example of a computing device 2 operating in a video mode displaying a text-based message in an overlay 72, in accordance with one or more aspects of the present disclosure. Computing device 2 includes a touch-sensitive display 70. In the example of FIG. 4A, computing device 2 may be engaged in a real-time video communication with another computing device, such as second computing device 22 used by second user 15. Computing device 2 has received a text message 74 from second user 15.

Touch-sensitive display 70 may display video 18 received from second computing device 22. Additionally, touch-sensitive display 70 may display a camera display 78. Camera display 78 may be an image that first computing device 2 is providing to second computing device 22, for example, via input to camera 16. Camera display 78 may be a small video overlay placed over video 18 in order to aid user 14 in properly framing camera 16.

Overlay 72 may be an image overlaid on top of video 18. Overlay 72 may be positioned anywhere on touch-sensitive display 70. Overlay 72 may contain a portion of or the entire textual content of text message 74, a URL link, a link to download a file, a link to initiate an action, or any other text-based content that conveys information. Overlay 72 may contain information related to received text message 74, as in the example of FIG. 4A, the message "Here's that URL: http://www.google.com/talk/". Text message 74 contains a URL 76 that links to a website or webpage. Overlay 72 may further comprise a user indication 80 that may indicate which user in the real-time video communication sent text message 74. As shown in FIG. 4A, second user 15 sent text message 74. User 14 may be able to receive information relating to text message 74 without interrupting the video chat.

At least a portion of overlay 72 may correspond to a touch target 82. A touch target 82 may be an image or icon displayed on touch-sensitive display 70 that, when activated by a user, causes computing device 2 to perform an action. User 14 may activate the touch target 82 by touching touch-sensitive display 70 where touch target 82 is located, or otherwise performing some gesture on touch-sensitive display 70. For example, user 14 may activate touch target 82 by tapping anywhere on touch-sensitive display 70 where overlay 72 is displayed.

Activating touch target 82 may cause computing device 2 to perform an action related to text message 74. In one example, touching touch target 82 may change the operating mode of computing device 2 (e.g., chat application 8) from video mode to text mode. In text mode, user 14 may be able to respond to text message 74. In another example, touching touch target 82 may perform another action while bypassing text mode. As shown in FIG. 4A, activating touch target 82 may link user 14 directly to a webpage corresponding to URL 76 without going into text mode. Text mode is described in more detail with respect to FIG. 4B. In another example, activating touch target 82 initiates a file transfer, selects a virtual button, or the like.

When the real-time video communication is a video conference between three or more participants, touch-sensitive display 70 may also display information relating to a second text message corresponding to another user. The information relating to the second text message may include a user indication 80 describing which user sent the second text message. In some examples, the user indication 80 may be a callout displaying a name appended to the text message in overlay 72 or may consist of displaying text message 74 in a unique color assigned to the user who sent text message 74. In another example, touch-sensitive display 70 may include an overlay containing identification information for each participant in the chat. In yet another example, such an overlay may provide status information for each participant, including, for example, what mode each user is in, whether the user is currently speaking, whether the user is currently available, etc.

In one example, text messages may be displayed in overlay 72 in chronological order. In another example, a plurality of text messages may be displayed in a plurality of overlay boxes. In yet another example, text message 74 is faded out or otherwise removed from overlay 72 after a selected timeout period has expired (e.g., after being displayed for 30 seconds). In another example, user 14 may remove the overlay before the selected timeout period by tapping the display device 4 in an area outside of overlay 72. Any method or style of displaying and removing text message 74 in overlay 72 is contemplated herein. For example, overlay 72 may be an approximately rectangular shape having an opaque, darkened background with lighter text.

In a further example, text message 74 may be saved in a cache. In another example, text message 74 may be removed from the cache when a selected decay period expires. In another example, text message 74 may be removed from the cache upon the occurrence of a triggering action. For example, the triggering action may include ending the text chat, ending the video chat, user 14 selecting a delete option, an additional participant joining either the text chat or video chat, or the like.

In video mode, a camera corresponding to computing device 2, such as camera 16, may be active and transmitting an image to second computing device 22. Furthermore, a microphone corresponding to computing device 2 may be active and transmitting sound to second computing device 22 during video mode. In another example, the microphone may be inactive and not transmitting sound to second computing device 22 during video mode, if, for example, user 14 is not speaking. Computing device 2 may also provide an operation indication signal to second computing device 22 indicating that computing device 2 is operating in video mode.

FIG. 4B is a block diagram illustrating one example of a computing device operating in a text mode during a real-time video communication, in accordance with one or more aspects of the present disclosure. In text mode, computing device 2 may still be engaged in a video chat. In some examples, text mode allows user 14 to compose and send a text message 84, which may be in response to a previous text message, such as text message 74. In text mode, touch sensitive screen 70 may provide a text input area 86 for user 14 to input text. For example, text input area 86 may be a virtual keyboard or an area to input handwriting.

In one example, in text mode, touch sensitive screen 70 may display previously received text messages, such as text message 74. In text mode, touch sensitive screen 70 may display a touch target 88 that may be used to switch computing device 2 into video mode. In one example, touch target 88 may be an icon showing video data from second computing device 22. In other examples, touch target 88 may be a block indicating that, when activated, computing device 2 may operate in video mode. In other examples, touch sensitive screen 70 may display a smaller view of video data 28 when the first computing device 2 is operating in a mode other than video mode (e.g., in text mode). In yet other examples, touch-sensitive display 4 does not display video data 28 when first computing device 2 is operating in text mode. In some examples, computing device 2 may pause and buffer the received video data while in text mode. In some examples, the buffered video may be available for playback. For example, user 14 may select to playback the buffered video once computing device 2 is back in video mode. In other examples, computing device 2 does not buffer the received video data during text mode.

In text mode, a camera corresponding to computing device 2, such as camera 16, may be inactive and not transmitting an image to second computing device 22. In other examples, camera 16 may remain active during text mode. For example, switching to text mode may cause computing device 2 to turn off camera 16 while continuing to send audio and output received audio. In such an example, a last frame sent from camera 16 before computing device 2 is toggled into text mode may be continued to be displayed on second computing device 22. Furthermore, a microphone corresponding to computing device 2, for example, microphone 38, may be active and transmitting sound to second computing device 22 during text mode. In one example, while operating in text mode, computing device 2 outputs first audio data received from the second computing device 22 and sends second audio data generated by the computing device 2 to the second computing device 22. In other examples, microphone 38 may be inactive during text mode. In some examples, computing device 2 provides user 14 with an option regarding whether camera 16 or microphone 38 should be active or inactive during text mode.

Computing device 2 may also provide an operation indication signal to second computing device 22 indicating that computing device 2 is operating in text mode. In another example, computing device 2 may provide a signal to second computing device 22 indicating that camera 16 is off while in text mode. When user 14 taps or otherwise activates touch target 88, computing device 2 may switch to video mode and activate camera 16.

Techniques of the present disclosure may allow a user to receive text messages without interrupting a real-time video conference. This allows users of mobile devices, such as those with small screens, to participate in video chat and instant messaging. Techniques described herein may enable a text signal to be presented simultaneously with a streaming video on a mobile device. Other techniques of the present disclosure may allow a user to switch between a video mode and a text mode for communicating via video chat or text chat, respectively, without interrupting either the video chat or the text chat. Techniques of the present disclosure extend to conference calls with more than two participating computing devices. A display may be altered based on how many participants are in a given conference call.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" is used to indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

The invention claimed is:

1. A method, comprising:
    receiving, by a first computing device, communication data sent from a second computing device while the first computing device and the second computing device are engaged in a real-time video communication session, wherein the communication data comprises first video data;
    while the first computing device is operating in a video mode, outputting, by the first computing device and for display at a touch-sensitive display, the first video data;
    receiving, by the first computing device, a text-based message from the second computing device during the real-time video communication session;
    overlaying, by the first computing device and at the touch-sensitive display, information related to the text-based message onto a display of the first video data;
    outputting, by the first computing device and for display at the touch-sensitive display, a touch target that, upon activation, toggles the first computing device between operating in the video mode and a text mode;
    while the first computing device is operating in the video mode, receiving, by the first computing device, one or more activation signals indicating that the touch target is activated;
    responsive to receiving the one or more activation signals while the first computing device is operating in the video mode, switching the first computing device to operate in the text mode and providing an operation indication to the second computing device indicating that the first computing device is operating in the text mode;
    while the first computing device is operating in the text mode:
        transmitting, by the first computing device and to the second computing device during the real-time video communication session, second video data provided by a camera of the first computing device;
        buffering, by the first computing device, third video data that is received by the first computing device from the second computing device; and
        after buffering the third video data, switching the first computing device to operate in the video mode; and
    while the first computing device is operating in the video mode, outputting, by the first computing device and for display at the touch-sensitive display, the third video data.

2. The method of claim 1, wherein the information related to the text-based message comprises at least one of a textual content of the text-based message, a Uniform Resource Identifier (URI), an image, a link to a file, and combinations thereof.

3. The method of claim 1, wherein the first computing device, responsive to receiving the one or more activation signals, further performs an action related to the text-based message.

4. The method of claim 3, wherein the information related to the text-based message comprises a Uniform Resource Locator (URL) link, and wherein the action related to the text-based message opens a webpage addressed by the URL link.

5. The method of claim 1, further comprising:
    outputting, by the first computing device, first audio data, wherein the communication data comprises the first audio data; and
    while the first computing device is operating in the text mode, sending second audio data from the first computing device to the second computing device during the real-time video communication session.

6. The method of claim 1, wherein overlaying the information related to the text-based message over the display of the first video data further comprises providing an overlay over the display of the first video data that contains text from the text-based message, wherein at least a portion of the overlay corresponds to the touch target.

7. The method of claim 6, wherein the overlay further provides a graphical user indication indicating that the text-based message is sent from the second computing device.

8. The method of claim 1, wherein the communication data further comprises audio data including speech, the method further comprising:
    converting at least a portion of the speech into text;
    translating the text into translated text of the selected language; and
    overlaying, by the first computing device and for display, at least a portion of the text or the translated text onto the display of the first video.

9. The method of claim 1, wherein the text-based message comprises a first text-based message, wherein at least a third computing device is further participating in the real-time video communication session between the first computing device and the second computing device, the method further comprising:
    receiving, by the first computing device and during the real-time video communication session, a second text-based message sent from the third computing device;
    overlaying, by the first computing device, information related to the second text-based message onto the display of the first video;
    graphically indicating that the information related to the first text-based message is sent from the second computing device; and graphically indicating that the information related to the second text-based message is sent from the third computing device.

10. The method of claim 1, further comprising:
removing, by the first computing device and from display, the information related to the text-based message after a selected timeout period.

11. The method of claim 1, wherein receiving the communication data further comprises receiving the communication data over a peer-to-peer connection between the first computing device and the second computing device.

12. The method of claim 1, wherein receiving the text-based message further comprises receiving the text-based message from a server communicatively coupled to the first computing device and to the second computing device.

13. The method of claim 12, wherein receiving the communication data further comprises receiving the communication data from the server.

14. A non-transitory computer-readable medium comprising instructions for causing at least one programmable processor to perform operations comprising:
receiving, by a first computing device, communication data that is sent from a second computing device while the first computing device and the second computing device are engaged in a real-time video communication session, wherein the communication data comprises first video data;
while the first computing device is operating in a video mode, outputting, by the first computing device and for display at a touch-sensitive display, the first video data;
receiving, by the first computing device and from the second computing device during the real-time video communication session, a text-based message;
overlaying, by the first computing device and at the touch-sensitive display, information related to the text-based message onto a display of the first video data;
outputting, by the first computing device and for display at the touch-sensitive display, a touch target that, upon activation, toggles the first computing device between operating in the video mode and a text mode;
while the first computing device is operating in the video mode, receiving, by the first computing device, one or more activation signals indicating that the touch target is activated;
responsive to receiving the one or more activation signals while the first computing device is operating in the video mode, switching the first computing device into the text mode and providing an operation indication to the second computing device indicating that the first computing device is operating in the text mode;
while the first computing device is operating in the text mode:
transmitting, by the first computing device and to the second computing device during the real-time video communication session, second video data provided by a camera of the first computing device;
buffering, by the first computing device, third video data that is received by the first computing device from the second computing device; and
after buffering the third video data, switching the first computing device to operate in the video mode; and
while the first computing device is operating in video mode, outputting, by the first computing device and for display at the touch-sensitive display, the third video data.

15. A first computing device, comprising:
one or more processors;
a network interface to receive communication data from a second computing device while the first computing device and the second computing device are engaged in a real-time video communication session, wherein the communication data comprises audio data and first video data;
a camera; and
a touch-sensitive display that displays the first video data while the first computing device is operating in a video mode;
wherein the one or more processors are configured to overlay, onto a display of the first video data, information related to a text-based message received by the first computing device and from the second computing device during the real-time video communication session, output, by the first computing device and for display at the touch-sensitive display, a touch target that, upon activation, toggles the first computing device between operating in the video mode and a text mode, while operating in the video mode, receive, by the first computing device, one or more activation signals indicating the touch target is activated, responsive to receiving the one or more activation signals, switch the first computing device into the text mode and provide an operation indication to the second computing device indicating that the first computing device is operating in the text mode, while the first computing device is operating in the text mode:
transmit, by the first computing device and to the second computing device during the real-time video communication session, second video data provided by the camera, buffer, by the first computing device, third video data received by the first computing device from the second computing device, and after buffering the third video data, switching the first computing device to operate in the video mode; and
while the first computing device is operating in the video mode, cause the touch-sensitive display to display the third video data.

* * * * *